US011383466B2

(12) United States Patent
Zaum et al.

(10) Patent No.: US 11,383,466 B2
(45) Date of Patent: Jul. 12, 2022

(54) METHOD AND DEVICE FOR SEALING AND INFLATING INFLATABLE ARTICLES, AND SEALING AGENT

(71) Applicant: Continental Reifen Deutschland GmbH, Hannover (DE)

(72) Inventors: Christopher Zaum, Seelze-Letter (DE); Philip Bialach, Hannover (DE); Rainer Detering, Neustadt am Ruebenberge (DE)

(73) Assignee: Continental Reifen Deutschland GmbH, Hannover (DE)

( * ) Notice: Subject to any disclaimer, the term of this patent is extended or adjusted under 35 U.S.C. 154(b) by 887 days.

(21) Appl. No.: 16/306,385

(22) PCT Filed: Feb. 27, 2017

(86) PCT No.: PCT/EP2017/054469
§ 371 (c)(1),
(2) Date: Nov. 30, 2018

(87) PCT Pub. No.: WO2017/207121
PCT Pub. Date: Dec. 7, 2017

(65) Prior Publication Data

US 2019/0275756 A1 Sep. 12, 2019

(30) Foreign Application Priority Data

May 30, 2016 (DE) ........................ 102016209302.9

(51) Int. Cl.
*B29C 73/16* (2006.01)
*C09J 11/06* (2006.01)
(Continued)

(52) U.S. Cl.
CPC ............ *B29C 73/166* (2013.01); *B05C 5/001* (2013.01); *B29C 73/163* (2013.01); *C09J 11/06* (2013.01);
(Continued)

(58) Field of Classification Search
CPC .................................................... B29C 73/166
See application file for complete search history.

(56) References Cited

U.S. PATENT DOCUMENTS 4,501,825 A 2/1985 Magyar et al.
4,765,367 A * 8/1988 Scott ...................... B60S 5/043 137/607
(Continued)

FOREIGN PATENT DOCUMENTS

DE 29812740 U1 12/1998
DE 19948706 A1 7/2000
(Continued)

OTHER PUBLICATIONS

International search report dated Jun. 9, 2017 of international application PCT/EP2017/054469 on which this application is based.

*Primary Examiner* — Timothy P. Kelly
(74) *Attorney, Agent, or Firm* — David L. Cate; Gregory Adams

(57) ABSTRACT

A method for sealing and inflating inflatable articles, in particular for sealing and inflating motor vehicle tires, wherein, by means of a compressor which is driven preferably by means of an electric motor, a sealing and pumping pressure is generated, wherein, by means of the sealing and pumping pressure, via a valve and distributor device for sealant and compressed gas and via compressed-air and sealant hoses between valve and distributor device and an entry valve or an inlet nozzle of the inflatable article, a sealant situated in a sealant vessel connected to the valve and distributor device is conveyed into the inflatable article and,
(Continued)

at the same time, the inflatable article is inflated to a predefined operating pressure, wherein, by configuration of the corresponding parameters, of the sealant and of the device, in or downstream of the entry valve/the inlet nozzle, the sealant is at least partially atomized to form an aerosol by virtue of the sealant or the sealant-air mixture being converted, in the entry valve or in the inlet nozzle, into a turbulent flow with a Reynolds number $R_e \geq 2300$.

6 Claims, 1 Drawing Sheet

(51) Int. Cl.

| | |
|---|---|
| ***C09J 107/02*** | (2006.01) |
| ***C09J 193/04*** | (2006.01) |
| ***B05C 5/00*** | (2006.01) |
| *B29L 30/00* | (2006.01) |

(52) U.S. Cl.
CPC .......... *C09J 107/02* (2013.01); *C09J 193/04* (2013.01); *B29L 2030/00* (2013.01)

(56) References Cited

U.S. PATENT DOCUMENTS

| | | | | |
|---|---|---|---|---|
| 8,470,909 | B2 | 6/2013 | Takahara et al. | |
| 9,511,623 | B2 | 12/2016 | Abe et al. | |
| 9,758,707 | B2 | 9/2017 | Ichikawa | |
| 9,771,503 | B2 | 9/2017 | Okamatsu | |
| 2012/0309867 | A1 | 12/2012 | Takahara | |
| 2017/0313003 | A1 * | 11/2017 | Eckhardt | B29C 73/166 |
| 2017/0326824 | A1 | 11/2017 | Bialach | |
| 2022/0024163 | A1 * | 1/2022 | Dahlke | B29C 73/166 |

FOREIGN PATENT DOCUMENTS

| | | | |
|---|---|---|---|
| DE | 202012101110 | U1 | 4/2012 |
| DE | 112013001275 | T5 | 1/2015 |
| JP | 2011026544 | A | 2/2011 |
| JP | 2011088016 | A | 5/2011 |

* cited by examiner

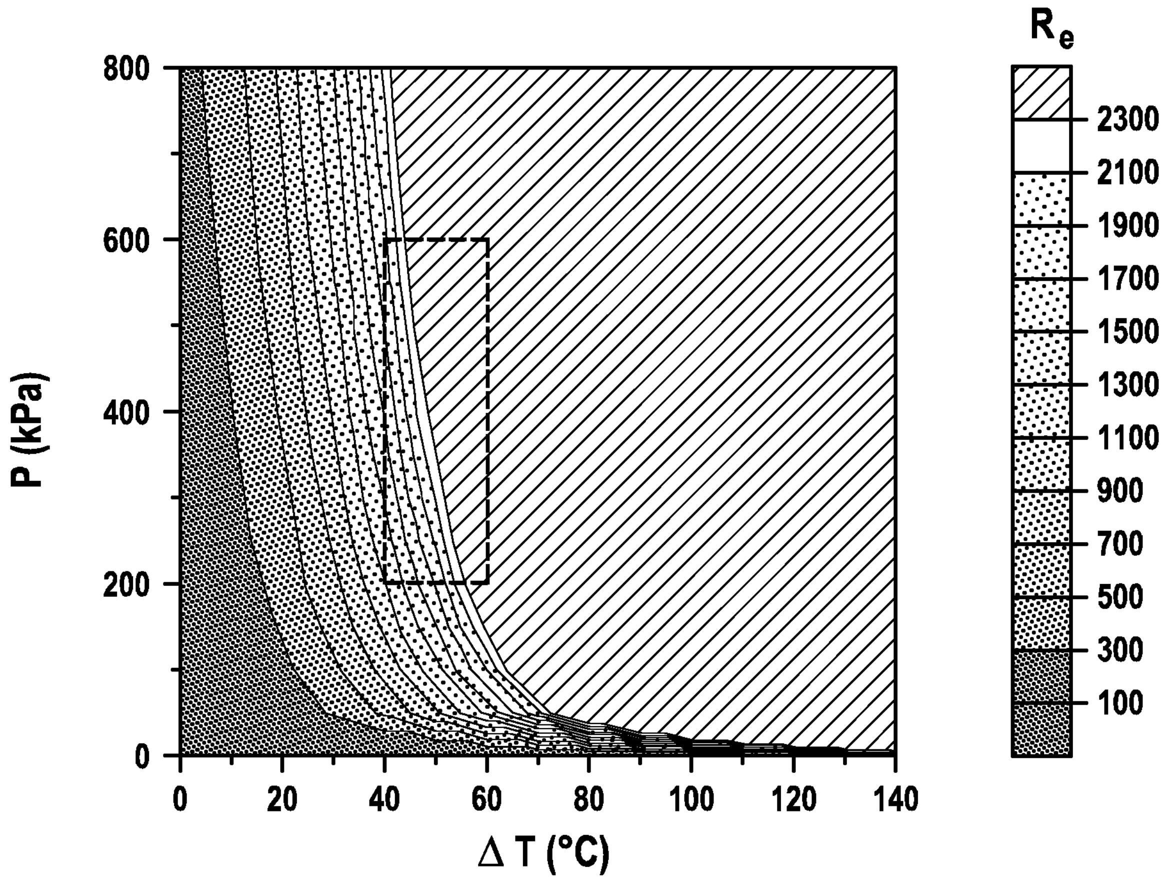
800
600
400
200
0
P (kPa)
0
20
40
60
80
100
120
140
Δ T (°C)
$R_e$
2300
2100
1900
1700
1500
1300
1100
900
700
500
300
100

METHOD AND DEVICE FOR SEALING AND INFLATING INFLATABLE ARTICLES, AND SEALING AGENT

CROSS REFERENCE TO RELATED APPLICATIONS

This application is the national stage of PCT/EP2017/054469, filed Feb. 27, 2017, designating the United States and claiming priority from German patent application no. 10 2016 209 302.9, filed May 30, 2016, the entire contents of which are incorporated herein by reference.

FIELD OF THE INVENTION

The disclosure relates to a method for sealing and inflating inflatable articles, in particular for sealing and inflating motor vehicle tires, wherein, by means of a compressor which is driven preferably by means of an electric motor, a sealing and pumping pressure is generated, by means of which, via a valve and distributor device for sealant and compressed gas and via compressed-air and sealant hoses between valve and distributor device and an entry valve or an inlet nozzle of the inflatable article, a sealant situated in a sealant vessel connected to the valve and distributor device is conveyed into the inflatable article and, at the same time, the inflatable article, after being sealed, is inflated to a predefined operating pressure, The disclosure also relates to a device and to a particularly suitable medium for carrying out the method, specifically a sealant.

BACKGROUND OF THE INVENTION

In the case of tire-related breakdowns, there is generally the problem that—as has hitherto been conventional for example in a passenger motor vehicle—a filled spare tire mounted on a wheel rim must be carried on board, which spare tire is then fitted in place of the wheel with the defective tire, following which the defective tire must be fastened in the stowage space provided in the vehicle for the spare tire and later taken for repair. For this purpose, it is not only often necessary to unload a laden vehicle in order to access the corresponding stowage space, but it is also necessary for the vehicle itself to be raised using vehicle jacks, and for cumbersome repair work to be performed.

To avoid these disadvantages, repair sets or breakdown kits for the temporary repair of the tire have already long been known which comprise a compressor, a sealant which coagulates in the tire, normally a latex milk mixture, the corresponding connecting hoses and the required cable connections for the supply of energy, and also a switch, manometer and operating element, and which thus provide a permanently usable and complete repair set, with which it is possible to dispense with carrying on board a spare wheel fitted on a wheel rim, or with the constant inspection of other repair materials such as hoses, various tool wrenches, vehicle jacks et cetera.

The sealant required for such breakdown kits may be applied either manually by the user (squeeze system) or by means of the air compressor (pump system). In the case of the pump system, after the initial start of the air compressor, the sealant is conveyed by means of a positive pressure from the corresponding sealant vessel into the damaged tire. In a second process step, the damaged tire is then filled with air up to a certain minimum pressure. In conventional systems, this refilling of the tire takes place counter to the outflow of air through the leak caused by the tire damage. Sealing of the leak occurs only after attainment of the minimum pressure, as a result of distribution of the sealant during onward travel. Without a tire movement for distributing the sealant in the tire, sealing of the tire leak is therefore difficult.

Since the corresponding tire must be filled up to a certain minimum pressure before the damage that has occurred is sealed, particularly high-powered air compressors are necessary for successful operation. This fact contributes significantly to the manufacturing costs of the overall system, and sets a lower limit for the structural size and the weight of tire-related breakdown kits.

SUMMARY OF THE INVENTION

It was therefore the object of the invention to facilitate the working steps in carrying out a repair using a breakdown kit and to modify the working steps such that a distribution of the sealant by means of a tire movement is as far as possible no longer required to the known extent, wherein, furthermore, it was also sought to provide a method and a device which, by means of a reduction in structural size and weight, can reduce the manufacturing costs of tire-related breakdown kits.

This object is achieved by a method for sealing and inflating inflatable articles, in particular for sealing and inflating motor vehicle tires, wherein, a compressor is driven by an electric motor, a sealing and pumping pressure is generated, wherein the sealing and pumping pressure, via a valve and distributor device for sealant and compressed gas and via compressed-air and sealant hoses between valve and distributor device and an entry valve or an inlet nozzle of the inflatable article, a sealant situated in a sealant vessel connected to the valve and distributor device is conveyed into the inflatable article and, at the same time, the inflatable article is sealed and inflated to a predefined operating pressure.

In this method, in or downstream of the entry valve/the inlet nozzle, the sealant is at least partially atomized to form an aerosol by virtue of the sealant or the sealant-air mixture being converted, in the entry valve or in the inlet nozzle, into a turbulent flow with a Reynolds number $R_e \geq 2300$, wherein the Reynolds number satisfies the following equation/in equation:

$$R_e = \sqrt{2}\,D\sqrt{p\frac{\rho}{\eta_0^2 \cdot e^{\frac{2\kappa}{T_0+\Delta T}}}} \geq 2300,$$

which comprises the following parameters:

$T_0$: ambient temperature,

D: characteristic diameter of the entry valve or of the inlet nozzle, $\Delta T$: difference between the temperature in the entry valve or in the inlet nozzle and the ambient temperature, p: conveying pressure of the sealant or sealant-air mixture, $\rho$: density of the sealant or sealant-air mixture, $\eta_0$ intrinsic viscosity of the sealant or sealant-air mixture, $\kappa$ characteristic temperature of the sealant or sealant-air mixture.

Further advantageous configurations are disclosed in the subclaims. Likewise disclosed are a device and a sealant that is particularly suitable for the method, with the aid of which the realization of a single general inventive concept is made possible, specifically that of the reliable and adequate distribution of the sealant within an inflatable article or tire, and thus the initiation of the required rapid sealing or coagulation of the sealant in the leak in the presence of an increase in pressure, using simple means.

Here, already in or downstream of the entry valve/the inlet nozzle, the sealant is thus at least partially atomized to form an aerosol by virtue of the sealant or the sealant-air mixture being converted, in the entry valve or in the inlet nozzle, into a turbulent flow with a Reynolds number $R_e \geq 2300$, wherein the Reynolds number satisfies the following equation/in equation:

$$R_e = \sqrt{2}\, D \sqrt{p \frac{\rho}{\eta_0^2 \cdot e^{\frac{2\kappa}{T_0 + \Delta T}}}} \geq 2300,$$

which comprises the following parameters:

$T_0$: ambient temperature,

D: characteristic diameter of the entry valve or of the inlet nozzle,

ΔT: difference between the temperature in the entry valve or in the inlet nozzle and the ambient temperature, p: conveying pressure of the sealant or sealant-air mixture, ρ: density of the sealant or sealant-air mixture $\eta_0$ intrinsic viscosity of the sealant or sealant-air mixture, κ characteristic temperature of the sealant or sealant-air mixture.

With the method according to the invention configured in this way, the aerosol that is produced is distributed already during the filling phase in the damaged tire, and is entrained by the air still flowing out through the leak at this stage. The aerosol is thus transported in the direction of the leak position by the volume flow of the compressor. In the damage/leak itself, the sealant aerosol than causes, by coagulation, a reduction in size in the context of a commencement of pre-sealing of the leak that is present. The pre-sealing that thus commences causes a reduction in size of the tire leak by at least 20% up to 100% in relation to the leak that is present without the use of sealant. Thus, the time required for filling the tire can be significantly shortened in relation to a conventional repair method in the case of a breakdown kit without pre-sealing, or a compressor of lower power can be used for the system.

The most important influential factors are in this case the dynamic viscosity η of the sealant and the conveying pressure p and the temperature increase ΔT at the entry valve or in the inlet nozzle of the damaged tire, that is, at the tire valve which in this case acts as an atomizer nozzle, in or downstream of which the formation of the aerosol occurs.

An advantageous embodiment consists in that, in the case of a conveying pressure p of the compressor of 200 to 600 kPa, the entry valve or the inlet nozzle is warmed such that the temperature difference ΔT of the entry valve or of the inlet nozzle with respect to the ambient temperature amounts to at least 10° C., preferably at least 40° C.

Here, the required temperature increase of the entry valve or of the inlet nozzle that acts as atomizer nozzle (in the case of a tire, the tire valve) is achieved by means of an adapted outlet temperature of the air compressor, wherein the outlet temperature of an air compressor that is typically used already lies, owing to the type of construction, considerably above the ambient temperature. The further increase of the temperature is achieved, by means of the configuration of a device which is particularly suitable for the method according to the invention, for example by virtue of the compressor or the compressor components exhibiting thermal insulation or being composed at least partially of materials of low thermal conductivity, preferably of plastic.

A further advantageous embodiment in the context of realizing a single general inventive concept consists, in the case of the device, in that the compressed-air and sealant hoses between valve and distributor device and the entry valve or the inlet nozzle of the inflatable article are thermally insulated or are composed of materials of low thermal conductivity. In this way, too, it is achieved that the outlet temperature of the air compressor does not severely drop again across the sealant hoses.

Specifically, what is critical for the method according to the invention is the cooling of the conveyed air on the path to the atomiser nozzle (tire valve). Typically, this path leads across the sealant vessel and through a connecting hose. To ensure effective heating of the nozzle, it can thus be achieved by means of the configuration according to the invention of the device components that the conveyed air or the air/sealant mixture are thermally insulated from the surroundings.

Here, in turn, a further advantageous effect is realized by means of a further embodiment of the method which consists in that the warming of the entry valve or of the inlet nozzle is realized by means of an electric heater. Although such an embodiment of the warming using an electric heater fundamental increases the complexity also of the device, it does however compensate other measures that could be necessary for obtaining the temperature.

A further advantageous embodiment consists in that the device is equipped with means which serve for suspension on or fastening to the inflatable article or to the motor vehicle tire and in the direct vicinity of the entry valve or of the inlet nozzle. Thus, the sealant hoses are made very short, and the heat loss between the output of the air compressor and the entry valve is once again minimized.

A further advantageous embodiment consists in that the device is assigned a fan which cools the compressor and which is controllable in a manner dependent on the temperature difference ΔT of the entry valve or of the inlet nozzle. Where permitted by the configuration of the compressor, it is then possible for the cooling fan to be briefly deactivated in order to further increase the outlet temperature at the compressor and thus also attain the required temperature for forming the turbulent flow at the entry valve or the inlet nozzle.

A further advantageous embodiment of the method consists in that the warming of the entry valve or of the inlet nozzle is realized by means of an increase of the outlet temperature of the compressor, by virtue of a piston stroke frequency of at least 2000 strokes per minute being used.

A sealant that is particularly suitable for carrying out the method is, in terms of its constituent parts, composed such that the aerosol formed by atomization comprises, in its condensed form, the following constituents:

2-25%, preferably 3-20% latex, with regard to solids content, 2-25%, preferably 3-20% of a tackifier, with regard to solids content, 2-40%, preferably 5-30% of one or more glycols with a vapor pressure of 5-15 Pa at 20° C. and a boiling point of 180° C. bis 220° C., and 20-85%, preferably 30-80% water.

It has surprisingly been found that such a sealant, when used in the method according to the invention, has the effect that a very rapid distribution in the tire or in the inflatable article occurs, and the abovementioned pre-sealing and coagulation are effected very rapidly, without the need for further movements of the tire, that is, for example without the vehicle having to be moved during the repair process.

A further advantageous embodiment of the sealant consists in that the latex is at least partially natural latex, and preferably has only natural latex. This assists the aerosol formation and the rapid distribution, without the coagulation capability being restricted.

A further advantageous embodiment of the sealant consists in that the tackifier is an adhesive resin, preferably a rosin resin dispersion, in particular if the mean particle size of the tackifier is smaller than 0.4 μm, preferably smaller than 0.3 μm. Such an embodiment is particularly suitable for realizing optimum formation of the aerosol.

A further advantageous embodiment of the sealant consists in that it comprises one or more surfactant sulfonates (strong surfactants), preferably anionic mono- or disulfonates and/or one or more alkyl aryl ether sulfates, in particular if the concentration of surfactants amounts to 0.5-5.0%.

Is thus possible to maximize the factor or parameter $\rho/\eta_0^2$. Here, the addition of surfactants effects a reduction in density ρ and in the dynamic viscosity r. Since the dynamic viscosity is however incorporated in squared form in the described factor, the desired maximization is typically attained above a certain concentration. The stated concentration of the surfactants is in this case advantageously 0.5-5.0%.

BRIEF DESCRIPTION OF THE DRAWING

The invention will now be described with reference to the single FIGURE of the drawing (FIG. 1) which shows a diagram.

DESCRIPTION OF THE PREFERRED EMBODIMENTS OF THE INVENTION

FIG. 1 shows a preferred embodiment of the method parameters for converting the flow into the turbulent range with a Reynolds number Re≥2300. The illustration shows the Reynolds numbers for a sealant according to the invention versus the conveying pressure P and the temperature increase ΔT at the atomizer nozzle. For typical conveying pressures of 200 to 600 kPa the compressor must in this case thus realize an increase of the nozzle temperature of 40 to 60° C. The region enclosed by the dashed line denotes the parameter range for the method according to the invention; the preferred working range according to the invention is the hatched region situated in the boundary of the dashed line.

The increase of the nozzle temperature is, as presented above, realized by means of an adapted outlet temperature of the air compressor. What is critical for the present application is the cooling of the conveyed air on the path to the tire valve/tire entry valve. The compressed air is conducted via the sealant vessel and through a connecting hose. To ensure effective warming/heating of the nozzle, the stated method embodiments and device configurations are implemented.

It is understood that the foregoing description is that of the preferred embodiments of the invention and that various changes and modifications may be made thereto without departing from the spirit and scope of the invention as defined in the appended claims.

The invention claimed is:

1. A method of sealing and inflating an inflatable article, which comprises:

driving a compressor with an electric motor to generate compressed gas, wherein the compressor comprises a valve and a distributor connected to a sealant vessel, and a compressed-air hose and a sealant hose connected to the valve and the distributor, and wherein the inflatable article comprises an entry valve or an inlet nozzle;

connecting the compressed-air hose and/or the sealant hose to the entry valve or the inlet nozzle;

conveying a sealant into the inflatable article by action of the compressed gas through the valve and the distributor via the compressed-air hose and/or the sealant hose into the entry valve or the inlet nozzle; and at least partially atomizing the sealant in or downstream of the entry valve/the inlet nozzle to form an aerosol by virtue of the sealant or the sealant-air mixture being converted into a turbulent flow with a Reynolds number Re≥2300, wherein the Reynolds number satisfies the following equation/inequation:

$$R_e = \sqrt{2}\,D\sqrt{p\frac{\rho}{\eta_0^2 \cdot e^{\frac{2\kappa}{T_0+\Delta T}}}} \geq 2300$$

wherein:

$T_0$ is ambient temperature,

D is the entry valve or inlet nozzle diameter,

ΔT is a difference between temperature in the entry valve or in the inlet nozzle and ambient temperature, p is the sealant or sealant-air mixture conveying pressure, ρ is the sealant or sealant-air mixture density, $\eta_0$ is the sealant or sealant-air mixture intrinsic viscosity, and κ the sealant or sealant-air mixture temperature.

2. The method of claim 1, wherein the inflatable article is a pneumatic vehicle tire.

3. The method of claim 1, further comprising warming the entry valve or the inlet nozzle when p of the compressor is 200 to 600 kPa such that the temperature difference ΔT of the entry valve or of the inlet nozzle with respect to the ambient temperature is at least 10° C.

4. The method of claim 3, wherein the temperature difference ΔT of the entry valve or of the inlet nozzle with respect to the ambient temperature is at least 40° C.

5. The method of claim 3, wherein the warming of the entry valve or of the inlet nozzle is due to an increase of the outlet temperature of the compressor, and wherein the driving of the compressor comprises driving by a piston stroke frequency of at least 2000 strokes per minute.

6. The method of claim 3, wherein the warming of the entry valve or of the inlet nozzle is accomplished by an electric heater.

* * * * *